United States Patent
De Groot

(10) Patent No.: US 8,786,198 B2
(45) Date of Patent: Jul. 22, 2014

(54) SYSTEM AND METHODS FOR AUTOMATICALLY CONFIGURING OF LIGHTING PARAMETERS

(75) Inventor: Bastiaan De Groot, Den Bosch (NL)

(73) Assignee: Koninklijke Philips N.V., Eindhoven (NL)

(*) Notice: Subject to any disclaimer, the term of this patent is extended or adjusted under 35 U.S.C. 154(b) by 337 days.

(21) Appl. No.: 13/254,865

(22) PCT Filed: Feb. 26, 2010

(86) PCT No.: PCT/IB2010/050836
§ 371 (c)(1),
(2), (4) Date: Dec. 19, 2011

(87) PCT Pub. No.: WO2010/100586
PCT Pub. Date: Sep. 10, 2010

(65) Prior Publication Data
US 2012/0091895 A1   Apr. 19, 2012

(30) Foreign Application Priority Data

Mar. 6, 2009   (EP) ..................................... 09154521

(51) Int. Cl.
*H05B 37/02* (2006.01)
*G05F 1/00* (2006.01)

(52) U.S. Cl.
USPC .......................................... 315/152; 315/291

(58) Field of Classification Search
USPC .......... 315/149–152, 154–156, 158–159, 291, 315/312
See application file for complete search history.

(56) References Cited

U.S. PATENT DOCUMENTS

| 6,263,260 B1 | 7/2001 | Bodmer et al. |
| 2005/0231134 A1* | 10/2005 | Sid ................................. 315/294 |
| 2006/0226336 A1* | 10/2006 | York et al. .................... 250/206 |
| 2008/0180270 A1* | 7/2008 | Veskovic et al. ......... 340/825.22 |

(Continued)

FOREIGN PATENT DOCUMENTS

| FR | 2884654 | 10/2006 |
| GB | 2444734 A | 6/2008 |

(Continued)

OTHER PUBLICATIONS

Sandhu et al., "Wireless Sensor Networks for Commercial Lighting Control: Decision Making with Multi-agent Systems", 2004, pp. 1-5, California.

(Continued)

*Primary Examiner* — Minh D A
(74) *Attorney, Agent, or Firm* — Yuliya Mathis

(57) ABSTRACT

The invention relates to automatically configuring of a lighting, particularly to creating a lighting, which follows a person, with a networked lighting system. A basic idea of the invention is to configure lighting in a network of lamps in that a lamp of the network adjusts its light emission depending on presence detection in its own direct environment and the presence detected in the environment of other lamps of the network. An embodiment of the invention relates to a system (10) for automatically configuring a lighting, wherein the system comprises
  a network of lamps (12), in which every lamp is coupled to a presence detector (14) and can receive signals from other lamps in the network, wherein a received signal indicates an activity detected by the presence detector coupled to the lamp, which transmits the signal, and wherein
  every lamp adjusts its light emission depending on the signal received from other lamps and the measurement of its presence detector.
The invention allows automatically configuring a lighting with a network of lamps for a certain area in that lights go on before a person gets to a certain area.

12 Claims, 3 Drawing Sheets

(56) References Cited

U.S. PATENT DOCUMENTS

2008/0306365 A1* 12/2008 Bunce et al. .................. 600/323
2009/0016046 A1* 1/2009 Witsenburg et al. .......... 362/145

FOREIGN PATENT DOCUMENTS

| WO | 03098977 | A1 | 11/2003 |
| WO | 2007119126 | A2 | 10/2007 |
| WO | 2008135942 | A1 | 11/2008 |

OTHER PUBLICATIONS

Wang et al., "Infrastructureless Location Aware Configuration for Sensor Networks", 2003-2004, pp. 1-10.

* cited by examiner

SYSTEM AND METHODS FOR AUTOMATICALLY CONFIGURING OF LIGHTING PARAMETERS

FIELD OF THE INVENTION

The invention relates to automatically configuring of a lighting, particularly to creating a lighting which follows a person, with a networked lighting system.

BACKGROUND OF THE INVENTION

The concept of lights that follow a person can be found at numerous places in literature, film and commercials. A currently used solution, to determine which lights should be activated after each other is to look if two lights are close to each other in physical space but this is not powerful enough; for example in a situation in which two pathways are positioned in parallel, but only separated by a few bushes, the lights will activate as soon as a light near them sees a pedestrian; then the lights on the parallel pathway will activate as well, which is not the intention. The same can be thought of when lights are on two different floors or separated by a thin wall.

SUMMARY OF THE INVENTION

It is an object of the invention to provide a system and method for automatically configuring of a lighting.

The object is solved by the subject matter of the independent claims. Further embodiments are shown by the dependent claims.

A basic idea of the invention is to configure lighting in a network of lamps in that a lamp of the network adjusts its light emission depending on presence detection in its own direct environment and the presence detected in the environment of other lamps of the network. According to embodiments of the invention, a lamp may further consider the historical patterns in activation of these presence detectors for adjusting its light emission. More specifically, the invention bases on the insight that by analyzing patterns in presence detection by different detectors of lamps of a network of lamps, it is possible to find out which lamps are close to each other in terms of how likely is it that a person will soon pass under a given lamp, given that the person is currently passing under another lamp. According to an embodiment of the invention, the analysis can be done by creating a recurrent neural network in a network of lamps, wherein in the recurrent neural network all the amount of light emitted by every lamp of the network is both an input and an output node to the network. Naturally, other ways to perform the analysis are also possible. The invention allows automatically configuring a lighting with a network of lamps for a certain area in that lights go on before a person gets to a certain area.

An embodiment of the invention provides a system for automatically configuring a lighting, wherein the system comprises a network of lamps, in which every lamp is coupled to a presence detector and can receive signals from other lamps and/or presence sensors in the network, wherein a received signal indicates an activity detected by the presence detector coupled to the lamp, which transmits the signal, and wherein every lamp adjusts its light emission depending on the signal received from other lamps and the measurement of its presence detector. In the network, each lamp may comprise its own presence detector, but one presence detector may be also shared be several lamps, for example a cluster of four neighbored lamps. Also, more presence detectors than lamps may be provided, so that a lamp may be coupled not only to one, but to two or more presence detectors or present detectors may be incorporated that are not directly coupled to a lamp. The presence detector coupled to a lamp may be adapted to detect presence and/or movement of persons. The network may be formed between all lamps either wired or wireless. In the network, a signal can be sent from one lamp to its physical close lamps, but it may be provided that the signal may also be sent to all the lamps in the network through for example hopping.

A lamp may adjust its light emission by performing the acts of receiving as inputs activity levels from the other lamps and the measurement of its presence detector, processing the received inputs, and adjusting the light emission depending on the processing. The activity level of a lamp may be represented by a number within a predetermined range, and the number determines the activity detected by a presence detector coupled to that lamp.

A received activity level from another lamp may comprise the history of activities detected by the presence detector coupled to this lamp, the processing of the received inputs may comprise a learning from the history of activities detected by presence detectors in order to determine the movement of a person, and the light emission may be adjusted based on the determined movement of a person. Thus, each lamp may store the activities detected by a presence detector coupled to that lamp and that of other presence detectors, so that a analysis of the historical activity data may be performed for learning how a person moves under the presence detectors. For example, when the activity level of a first lamp decreases, and the activity level of a neighbored second lamp arranged close to the first lamp increases, then it may be learned from the analysis of the courses of the activity levels received from both lamps that a person moves in the direction from the first lamp to the second lamp, and it may be learned that the person may soon enter the area of the presence detector coupled to a third lamp, which is located close to the second lamp in the network of lamps. The learning process may be also speed up if the received inputs are filtered for example by the strength of the radio signal and/or the time of flight of the signal transmitting an activity level from a lamp. For example, the inputs may be filtered in that only signals with a radio signal strength larger than a predetermined value or a time of flight lower than a predetermined value may be considered for processing inputs. This allows a processing of only inputs received from lamps in the close neighborhood and an acceleration of the learning, since the number of received inputs may be reduced.

Furthermore, an embodiment of the invention relates to a method for automatically configuring a lighting in a network of lamps, comprising the following acts:

receiving signals from other lamps in the network, wherein a received signal indicates an activity detected by a presence detector coupled to the lamp, which transmits the signal, receiving a measurement of a presence detector coupled to said lamp, and adjusting the light emission of said lamp depending on the signals received from the other lamps and the measurement of the presence detector coupled to said lamp. The method may be implemented as a control algorithm for the light emission of networked lamps and thus for automatically configuring a lighting. It may be implemented in the lamps, or in a central controller for the network of lamps, which is adapted to centrally control the lighting created by the lamps network.

The processing of the received inputs may comprise processing the inputs with a weight function, wherein every input is weighted and the used weights are adjusted continuously depending on the activity detected by one or more presence detectors. The weighting allows adjusting the light emission of a lamp in accordance with the activity under other lamps and the movement or presence of a person under the other lamp.

The adjusting of the weights depending on the activity detected by one or more presence detectors may comprise
increasing the weights of two or more lamps if the presence detectors coupled to these lamps detect activity within a predetermined time span and/or if the activity levels of these lamps follow the same pattern, otherwise
decreasing the weights of two or more lamps. Thus, the light emission of a lamp is increased if for example the presence detectors of neighbored lamps detect an increased activity. On the contrary, if the presence detectors of neighbored lamps show no increased activity, the light emission of a lamp may be decreased since obviously no person is present under the lamp.

The processing of the received inputs may also comprise processing the inputs with a sigmoid function, a radial basis function or a softmax activation function. These functions are typically applied in artificial neural networks and may be suitable to give also an appropriate output to adjust the light emission of a lamp.

The function used for processing the inputs may further comprise a time delay by using only or additionally activations of lamps which are a predetermined step back in time.

A further embodiment of the invention relates to a lamp being adapted for application with a system of the invention and as described above, wherein the lamp comprises
a light source,
a communication unit for creating network connections and communicating with other lamps,
a presence detector,
a memory storing a configuration of the lamp and a program for controlling the activity of the lamp depending on inputs received from other lamps and on measurements of the presence detector, and
a processing unit for executing the program stored in the memory. This lamp may be incorporated as a physical entity and allows a quick and easy installation of a system for automatically configuring a lighting according to the invention. The communication unit of the lamp may be adapted to automatically create network connections with neighbored lamps, either wired or wireless. The presence detector may be adjustable in order to allow a flexible usage and installation of the lamp.

An embodiment of the invention provides a computer program enabling a processor to carry out the method according to the invention and as described above.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer). The computer may implement for example a central controller of a lamps network and automatically configure the lighting.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
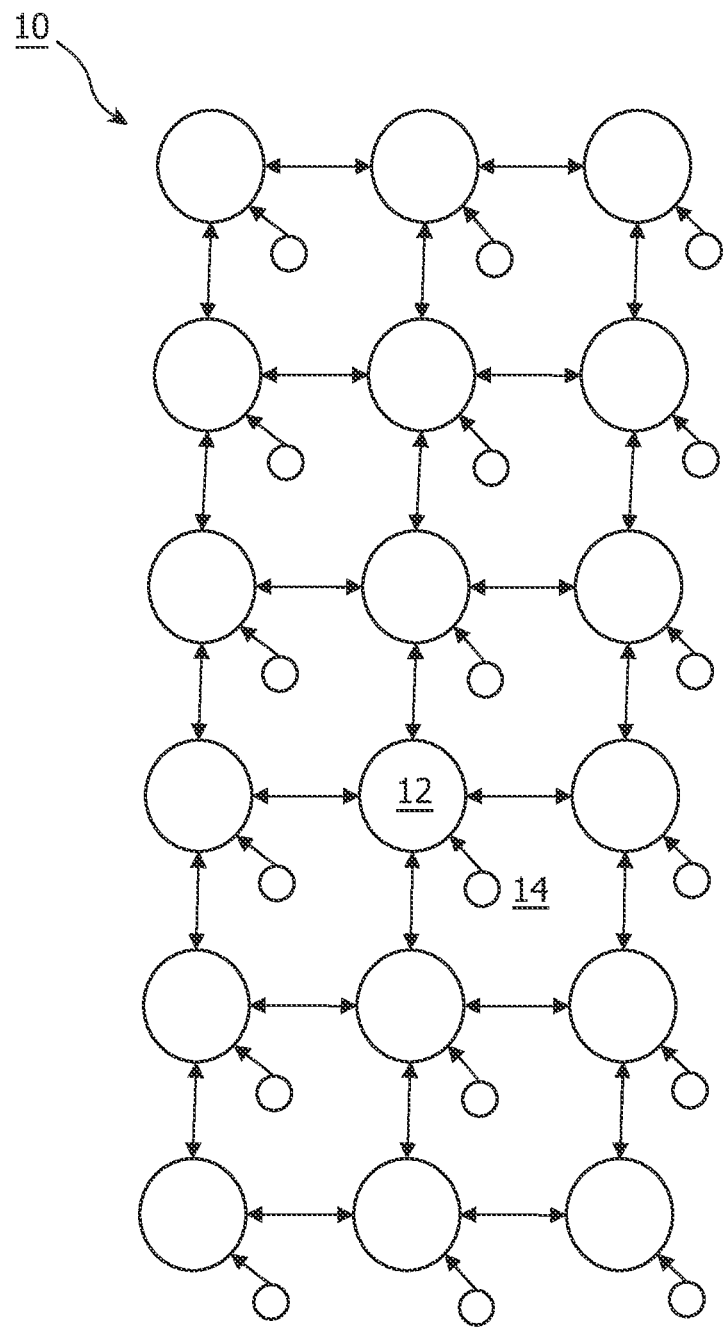
FIG. 1 shows an embodiment of a system for automatically configuring a lighting according to the invention.

In the following, functionally similar or identical elements may have the same reference numerals.

FIG. 1 shows a system 10 for automatically configuring the lighting in a network of lamps 12, each being coupled to a presence or movement detector 14, according to the invention. The lamps 12 are arranged in a rectangular grid and may be for example installed in a stairway. It should be noted that in principle the present invention is applicable to any network topology, and it is not limited to a rectangular grid. Every lamp 12 can communicate with its direct neighbors in the grid, and also with other lamps in the grid since the network is configured for message hopping, i.e. a message sent from a first lamp to a second lamp in the grid may be routed via several lamps.

Every lamp keeps a number within a predetermined range, for example from 0 . . . 1 (but it can be any number), which determines how strong the lamp is burning (0 is off and 1 is full bright). Every lamp regularly updates its current activation by taking the normalized weighted sum of the amount of activity detected by its own presence detector 14 (which also outputs a number within a certain interval or simply returns 0 or 1 or any other two random numbers). This updating can happen both synchronous or asynchronous. The presence detector 14 is able to detect the presence and movement of persons and is arranged so that it covers an area under the lamp 12, which is also highlighted by the lamp 12.

Every lamp 12 is further configured to broadcast its activity level in the network so that other lamps may receive the activity level as input. The activity level is transmitted by means of a signal and may be implemented for example also as a number within a predetermined range from 0 . . . 1, which indicates the activity detected by the presence detector coupled to the lamp. The activity level may be periodically broadcast by every lamp in that every lamp transmits a signal containing its activity level to all other lamps in the network. Every lamp 12 is further adapted to store a history of the activity levels and to transmit this history with the broadcast of its activity level, so that a receiving lamp can determine the course of the activity detected by the presence detector of the lamp transmitting the history of activity levels. The history of activity levels allows a lamp to learn from this and is able to better adjust its light emission to the movement of a person.

In the network, every lamp 12 receives as inputs the activity levels of all other lamps of the grid and the measurements of the presence detector 14 coupled to the lamp 12. Every lamp 12 may filter the received inputs for example by evaluating the strength of the radio signal and/or the time of flight of a signal transmitted from another lamp. Particularly, inputs from lamps located far away from a receiving lamp may be disregarded since the activity detected by such lamps may have only a minor or even no influence on the local lighting configuration of the receiving lamp. The filtering has the advantage that the amount of information to be processed by a lamp may be reduced, and thus a process of learning from the received inputs may be accelerated. Every lamp 12 processes the particularly filtered inputs and adjusts its light emission as output depending on the processing. The processing of the inputs may be performed by applying a function to the inputs and generating an appropriate output for adjusting the emitted light. The applied function may be a learning function, which is adapted to learn from the received histories of activity levels detected by the presence detectors of the other lamps in the network. In particular embodiments of the invention, the applied function may one as typically used in recurrent neural networks, such as a normalized weighted summation, a sigmoid function, a radial basis function or a softmax activation function.

Figure 2:
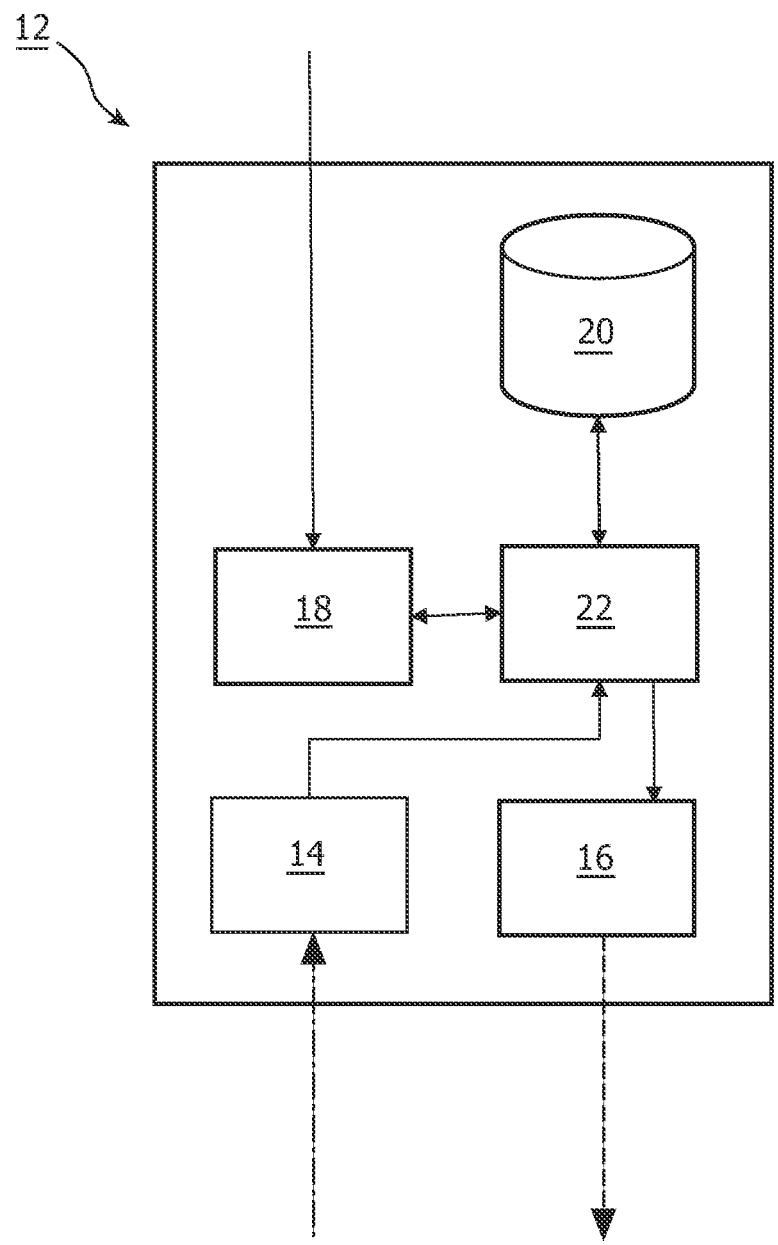
FIG. 2 shows a first embodiment of a lamp which may be applied in the system of FIG. 1.

FIG. 2 shows n embodiment of a lamp according to the invention by means of a block diagram. The lamp 12 is embodied as a physical entity and comprises a presence detector 14, for example a PIR, CCD, sonar, a controllable light source 16, a communication chip 18, a memory 20, and a microcontroller 22. The microcontroller 22 is the central control unit of the lamp 12 and executes a program stored in the memory 20, which implements a method for configuring the lighting or light emission of the controllable light source 16. The controllable light source 16 receives from the microcontroller 22 a signal adjusting its light emission. The microcontroller 22 receives as inputs measurements from the presence detector 14 and data from the communication chip 18, which is connected with other lamps 12 in the network of lamps as shown in FIG. 1. The data from the communication chip are the activity levels transmitted by all lamps 12 of the network. The program configures the microcontroller 22 to process the received inputs and to generate an appropriate signal to adjust the light emission of the light source 16. The program may implement one of the functions mentioned above, for example typical functions employed in an artificial neural network, particularly a recurrent neural network.

Figure 3:
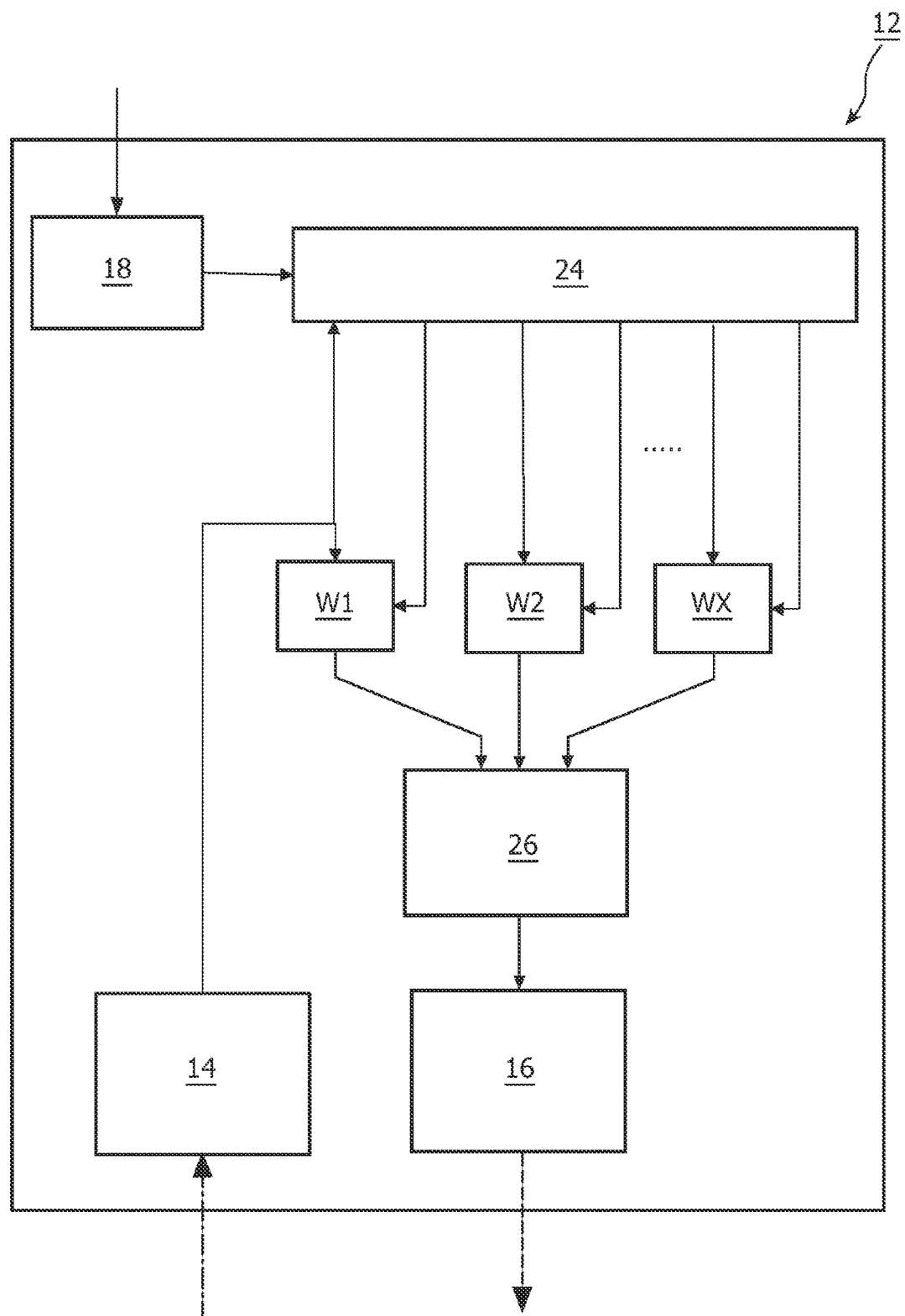
FIG. 3 shows a second embodiment of a lamp which may be applied in the system of FIG. 1.

FIG. 3 shows a block diagram of a further embodiment of a lamp according to the invention with a hardware implementation of the function used for processing the inputs. The hardware function may be for example implemented by an ASIC (Application Specific Integrated Circuit) or a FPGA (Field Programmable Gate Array). In the shown embodiment, the memory 20 and microcontroller 22 of the embodiment of FIG. 2 are replaced by a hardware implementation comprising a weight processing unit 24, X weighting functions W1, W2, ... WX for weighting X inputs, i.e. the measurements of the presence detector 14 and X−1 activity levels of X−1 lamps of the network, with appropriate weights, and a summation and normalization unit 26 for summing the weighted inputs and normalize the summation result. The weight processing unit 24 processes from the received inputs adjusting signals for the weighting functions W1 ... WX. Furthermore, the weight processing unit 24 outputs the activity levels of the lamps X−1, which were received from the communication chip 18 via the network of lamps to the corresponding weighting functions, i.e. activity level of lamp 1 to the weighting function W2, activity level of lamp 2 to the weighting function W2 and so on. The weight processing unit 24 regularly updates the current activation depending on the measurements of the presence detector 14. The weight processing unit 24 also regularly updates the weights for the activity levels of the other lamps in the network. This is done by the weight processing unit 24 using the following measurements:

If the presence detectors of two lamps see activity at the same time or shortly after each other, the weights of these two lamps used for weighting each other's activity level is increased. If there is a time difference then off course a different update rule can be used depending on which lamp sees the activity first.

The activity levels of two lamps are compared: if their activity levels follow the same pattern, for example if one is high (low) when the other is also high (low), or when their derivatives of activation are both positive (negative), their weights should be increased.

These rules should be red that if they do not apply at any moment in time the weights the lamps use for weighting each other should be decreased. The processing of the weights as described above results in a lighting system for which the lamps can be placed randomly and will automatically configure themselves to light up in front of a passing person and dim slowly behind the person.

The main problem solved by this procedure is that when one wants to setup a lighting system for a certain area and want the lights to go on before a person gets to a certain area one has to specify which light have to turn on when there is an activation at certain sensor and has to reason explicitly about which direction the user is walking. This is however all configured automatically by the invention. A first insight supporting the invention is that by analyzing the patterns in presence detection by the different presence detectors in the network of lamps, it can be found out which lamps are close to each other in terms of how likely is it that a person will soon pass under a given lamp given that she/he is currently passing under another lamp. A second insight is that analysis can be done by creating a recurrent neural network in which all the amount of light emitted by very lamp is both an input and an output node to the network. A third minor insight is that if the presence detectors and the lamp form a physical entity then the coupling between the presence detector and that lamp is automatically.

The invention can be used in all kinds of lighting systems in which the lighting system should "think ahead" of where a person is going and turn the lights on in advance so the person can already see where she/he is going. The invention could however also be used in other situation such as in decorative or art systems in which the system somehow follows the user for example by decorative light, video or computer images projected on the wall or ceiling, or with other output modalities such as sound and water.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A system for automatically configuring lighting parameters, the system comprising a network of lamps coupled to a presence detector, each lamp being configured to receive signals from other lamps in the network, wherein a received signal indicates an activity detected by the presence detector coupled to the lamp, which transmits the signal, and wherein every lamp adjusts its light emission depending on the signal received from other lamps and the measurement of its presence detector, and wherein each lamp is configured to adjust its light emission by performing the acts of receiving as inputs activity levels from the other lamps and the measurement of its presence detector, processing the received inputs, and adjusting the light emission depending on the processing.

2. The system of claim 1, wherein
a received activity level from another lamp comprises the history of activities detected by the presence detector coupled to this lamp,
the processing of the received inputs comprises a learning from the history of activities detected by presence detectors in order to determine the movement of a person, and
the light emission is adjusted based on the determined movement of a person.

3. The system of claim 1, wherein the processing of the received inputs comprises processing the inputs with a weight function, wherein every input is weighted and the used weights are adjusted continuously depending on the activity detected by one or more presence detectors.

4. The system of claim 3, wherein the adjusting of the weights depending on the activity detected by one or more presence detectors comprises
increasing the weights of two or more lamps if the presence detectors coupled to these lamps detect activity within a predetermined time span and/or if the activity levels of these lamps follow the same pattern, otherwise
decreasing the weights of two or more lamps.

5. The system of claim 3, wherein the function used for processing the inputs further comprises a time delay by using only or additionally activations of lamps which are a predetermined step back in time.

6. The system of claim 1, wherein the processing of the received inputs comprises processing the inputs with a sigmoid function, a radial basis function or a softmax activation function.

7. A lamp comprising
a light source,
a communication unit for creating network connections and communicating with other lamps,
a presence detector,
a memory storing a configuration of the lamp and a program for controlling the activity of the lamp depending on inputs received from other lamps and on measurements of the presence detector, and
a processing unit for executing the program stored in the memory, wherein the processing unit adjusts a light emission of the light source in response of receiving, by the communication unit, as inputs activity levels from the other lamps and the measurement of its presence detector by processing the received inputs and the measurement of the presence detector and by adjusting the light emission depending on the processing.

8. A method for automatically configuring a lighting in a network of lamps, comprising the following acts:
receiving signals from other lamps in the network, wherein a received signal indicates an activity detected by a presence detector coupled to the lamp, which transmits the signal, receiving a measurement of a presence detector coupled to said lamp, and
adjusting the light emission of said lamp depending on the signals received from the other lamps and the measurement of the presence detector coupled to said lamp, wherein the received signals contain activity levels from said lamps and the light emission of the lamp is adjusted depending on a processing of the activity levels and the measurement of the presence detector as inputs.

9. The method of claim 8, wherein
a received activity level from another lamps comprises the history of activities detected by the presence detector coupled to this lamp,
the processing of the received inputs comprises a learning from the history of activities detected by presence detectors in order to determine the movement of a person, and
the light emission is adjusted based on the determined movement of a person.

10. The method of claim 9, wherein the adjusting of the weights depending on the activity detected by one or more presence detectors comprises
increasing the weights of said lamps if the presence detectors coupled to these lamps detect activity within a predetermined time span and/or if the activity levels of said lamps follow the same pattern, otherwise
decreasing the weights of said lamps.

11. The method of claim 8, wherein the processing of the inputs comprises processing the inputs with a weight function, wherein every input is weighted and the used weights are adjusted continuously depending on the activity detected by one or more presence detectors.

12. The method of claim 8, wherein the processing of the received inputs comprises processing the inputs with a sigmoid function, a radial basis function or a softmax activation function, and/or wherein the function used for processing the inputs further comprises a time delay by using only or additionally activations of lamps which are a predetermined step back in time.

* * * * *